United States Patent
Cox

Patent Number: 5,966,860
Date of Patent: Oct. 19, 1999

[54] FISHING HOOK ASSEMBLY AND METHOD

[76] Inventor: D. Blake Cox, 5385 Valleydale Rd., Kernersville, N.C. 27284

[21] Appl. No.: 09/015,862

[22] Filed: Jan. 29, 1998

[51] Int. Cl.⁶ .................................................... A01K 83/06
[52] U.S. Cl. ............................................................. 43/44.81
[58] Field of Search ................................. 43/42.5, 42.52, 43/42.39, 44.81

[56] References Cited

U.S. PATENT DOCUMENTS

| | | | |
|---|---|---|---|
| 1,582,171 | 4/1926 | Foss | 43/42.5 |
| 2,598,011 | 5/1952 | Pitre | 43/42.39 |
| 2,895,252 | 7/1959 | Tibbetts | 43/42.39 |
| 3,060,619 | 10/1962 | Cornick | 43/44.81 |
| 3,153,876 | 10/1964 | Multanen | 43/42.5 |
| 3,377,734 | 4/1968 | Snow | 43/42.39 |
| 3,453,768 | 7/1969 | Feaster et al. | 43/42.39 |
| 5,077,931 | 1/1992 | Marshall | 43/42.52 |

OTHER PUBLICATIONS

Jann's Netcraft; *The Complete Catalog;* 1998; pp. 4–9.
Drawings from co-pending design application Serial No. 29/059,387.
Drawings from co-pending design application Serial No. 29/043,814.

*Primary Examiner*—Thomas Price

[57] ABSTRACT

This invention is drawn to a weighted fishing hook assembly. The hook assembly includes a substantially flat deflector, with a slightly arcuate cross section. Slightly rearward of center a hook is attached which depends downwardly from the deflector. Directly beneath the hook attachment point is a weight. A lure is attached to the hook and the hook assembly is ready for use with the enclosed method.

19 Claims, 3 Drawing Sheets

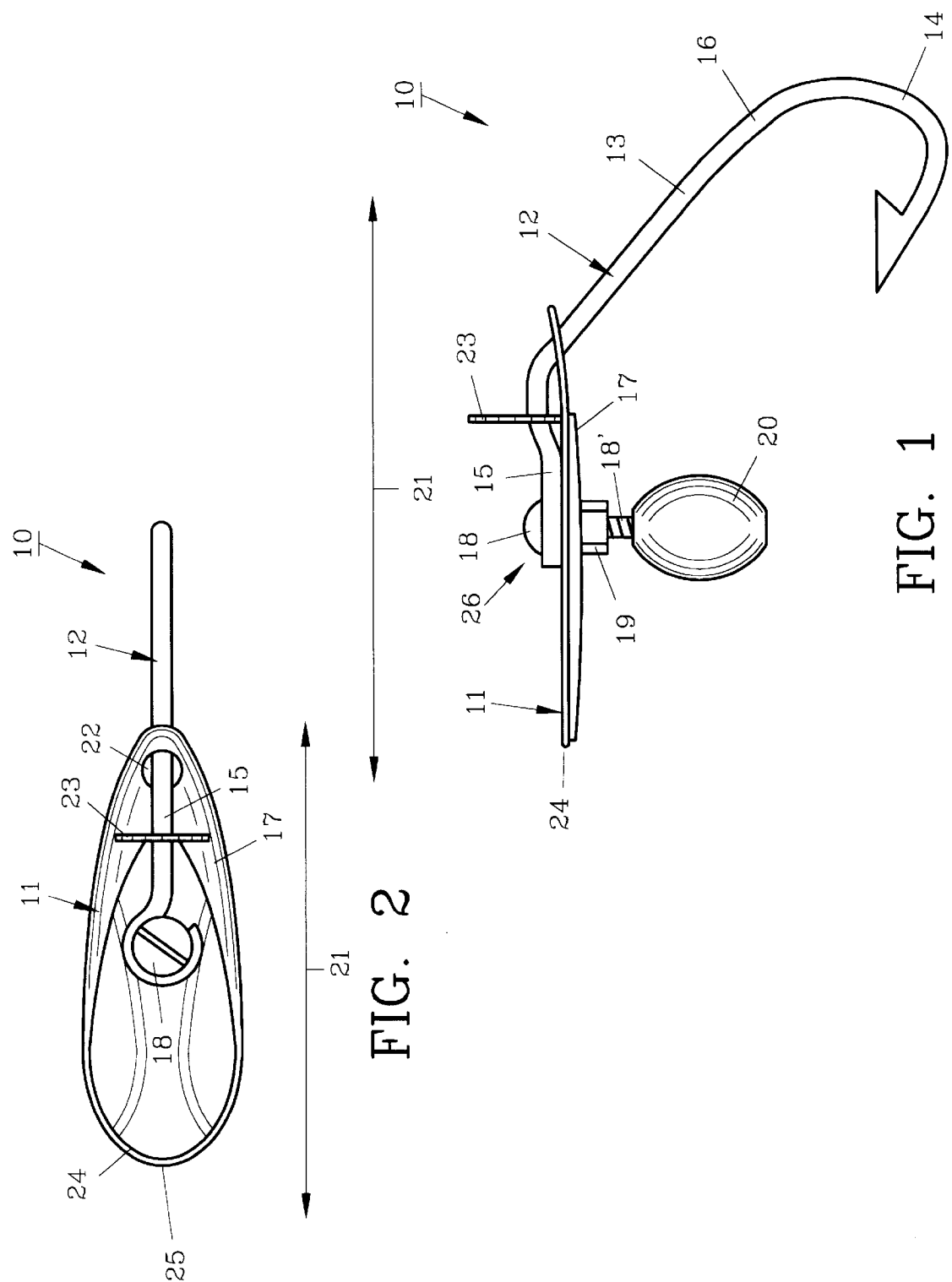

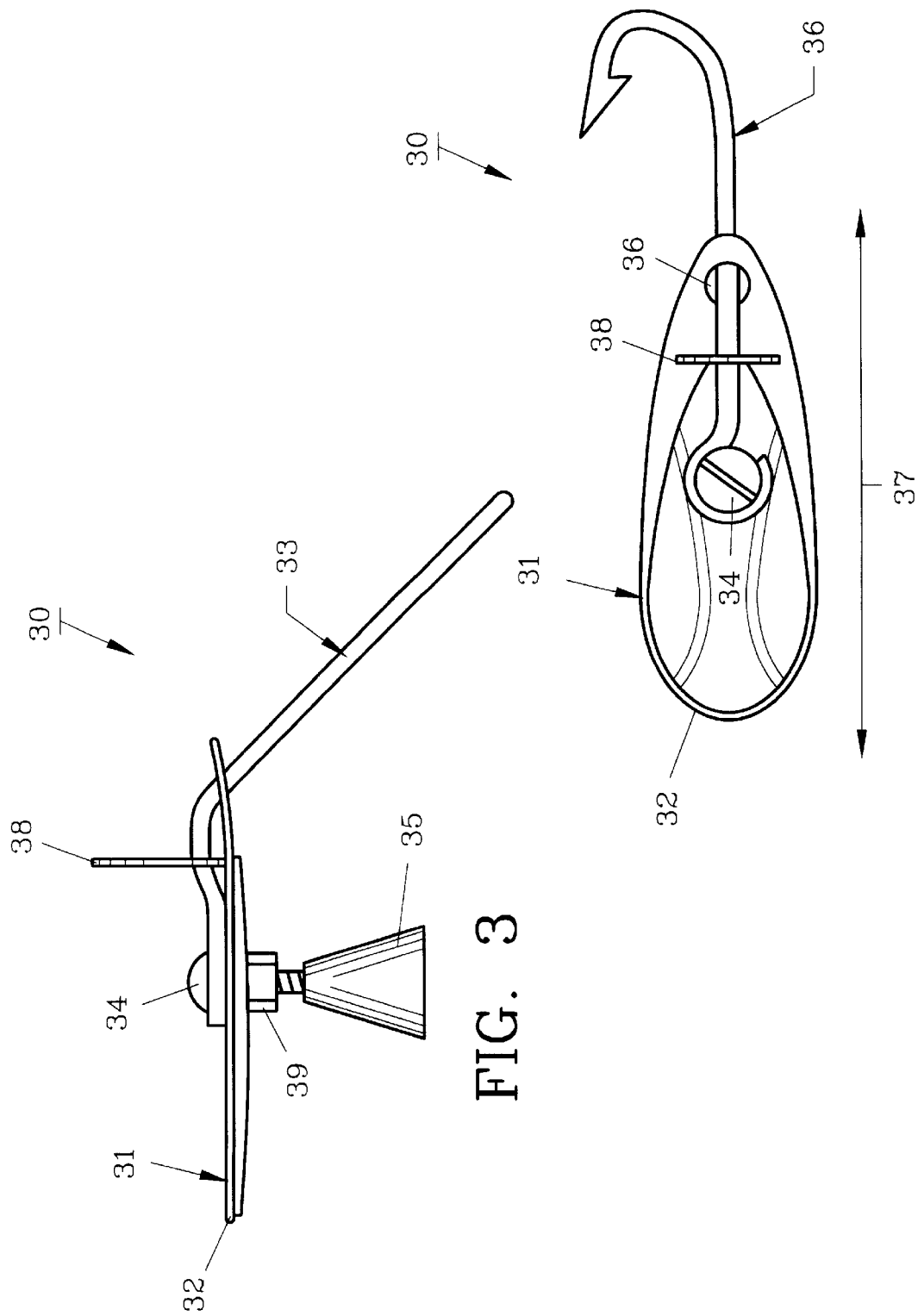

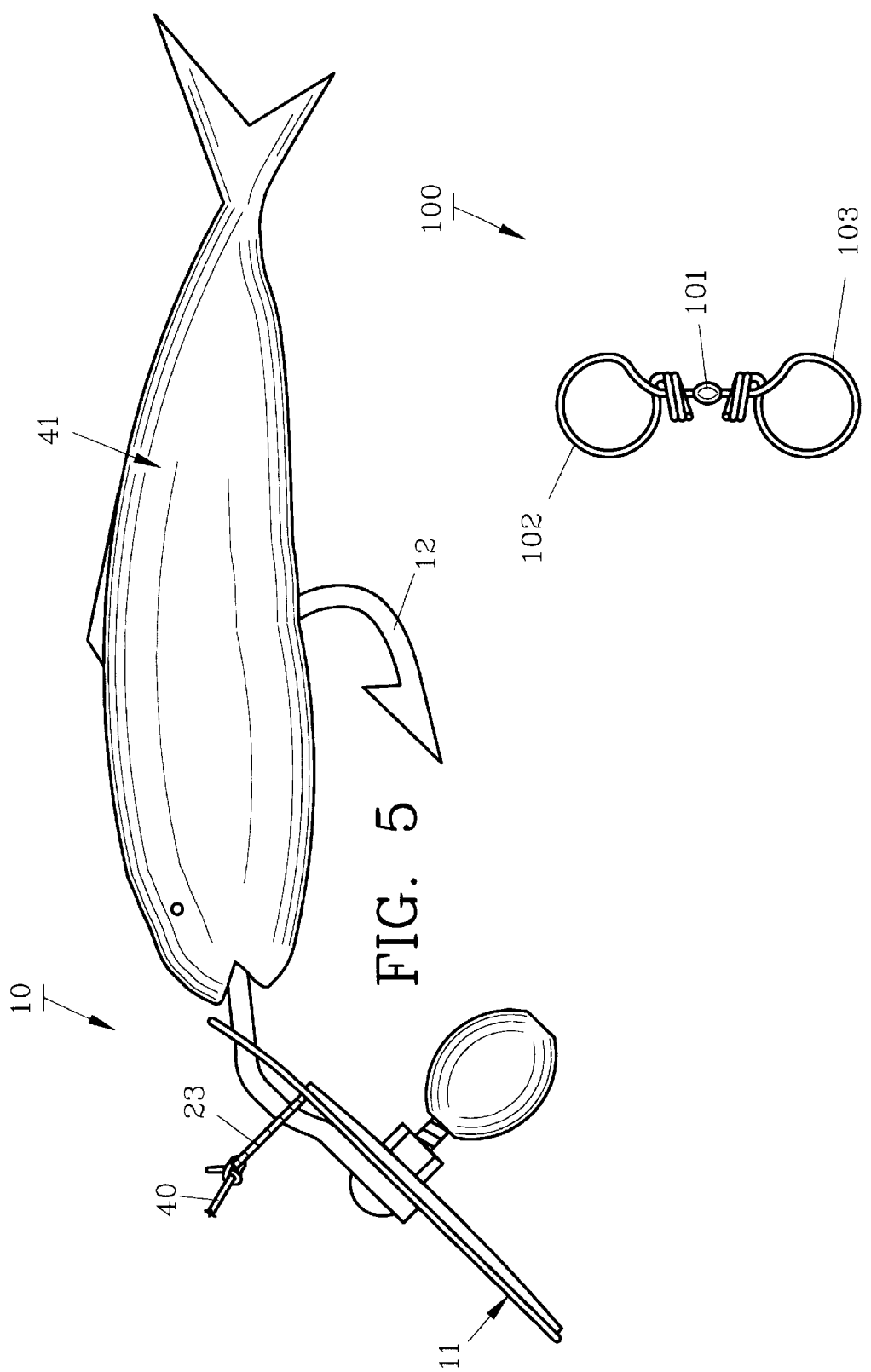

FISHING HOOK ASSEMBLY AND METHOD

BACKGROUND OF THE INVENTION

1. Field of the Invention

This invention pertains to a weighted fishing hook assembly for use with a variety of commercially available synthetic or other lures.

2. Description of the Prior Art and Objectives of the Invention

Fishing and its supporters and industries are always looking for a better lure with which to catch fish. The market supports an endless variety of synthetic worms, eels, fishes, crawdads and the like with or without the hooks preinserted therein. Additionally, numerous lures exist which attempt to mimic the natural movements of a fish or similar creature. However, despite the abundance of devices on the market, there still is room for a more realistic lure or hook assembly which may increase the likelihood of catching a fish.

Therefore, it is an objective of the present invention to provide a fishing hook assembly which imitates the movement of a real creature under water.

It is a further objective to introduce a new hook assembly which may increase the likelihood of catching a fish.

It is still a further objective to introduce a flat bodied hook assembly which includes a weight depending therefrom to change the hydrodynamic properties of the hook assembly and increase the realism of the lure.

It is yet a further objective to introduce a hook assembly which includes a loop proximate the hook for easy attachment to a fishing line.

It is another objective to introduce a hook assembly which includes a generally flat ovoid shaped body section or deflector which is easily drawn through the water.

SUMMARY OF THE INVENTION

This invention pertains to a fishing hook assembly which includes a generally flat spoon or ovoid shaped body or deflector, a hook, a loop and a weight. The hook extends along a portion of the deflector and depends from the rear thereof at an angle, or non-perpendicularly thereto. The weight depends vertically from the deflector by a small post and is preferably either conical or generally egg-shaped. The loop is contiguous to the hook and proximate the deflector, preferably at the rear portion of the same. The deflector includes a slight lip to give it a somewhat arcuate cross section. The hook assembly is preferably made from metal, and is adapted to be used with a conventional lure such as a synthetic eel, worm, crawdad or other creature.

A method of using the hook assembly is included which comprises attaching the hook assembly to a fishing line, attaching a lure to the hook, casting the hook assembly and then trolling the hook assembly behind a boat or the like. This activity draws the hook assembly through the water so that the lure is drawn behind the hook assembly and chaotic motions of the water caused by the hook assembly flutter the lure and cause fish to strike.

BRIEF DESCRIPTION OF THE DRAWINGS

FIG. 1 shows a side view of the first embodiment of the present invention;

FIG. 2 illustrates a top view of the embodiment of FIG. 1;

FIG. 3 demonstrates a side view of the preferred embodiment of the present invention;

FIG. 4 features a top view of the embodiment of FIG. 3;

FIG. 5 pictures a side schematic view of the embodiment of FIG. 1 with a lure attached thereto as being drawn through the water; and FIG. 6 depicts an alternate loop suitable for use with the present invention.

DETAILED DESCRIPTION OF THE PREFERRED EMBODIMENT AND OPERATION OF THE INVENTION

Turning now to the drawings, specifically FIGS. 1 and 2 show the first embodiment of the present invention. Hook assembly 10 includes generally flat, spoon like or ovoid shaped body or deflector 11. Hook 12 includes shank 13 and arcuate barb 14. For clarity, shank 13 is divided into proximal portion 15 and distal portion 16. Proximal portion 15 is attached to deflector 11 at point 26, which is slightly to the rear of the center of deflector 11, and thus in rear section 17, although hook 12 is laterally centered on deflector 11 as shown in FIG. 2. Hook 12 is attached to deflector 11 by suitable means such as by bolt 18 and nut 19. Egg-shaped weight 20 is affixed to the post 18' of bolt 18. This affixation is preferably threaded, but other attachments are contemplated such as a heat weld or the like. Hook 12 is aligned parallel with longitudinal axis 21 of deflector 11, with barb section 14 parallel thereto as well. Proximal portion 15 extends along rear section 17 of deflector 11 and passes through hole 22 defined thereby. Distal portion 16 extends downwardly, non-perpendicularly from deflector 11 and away from weight 20 as seen in FIG. 1. Herein, weight 20 and bolt 18's orientation relative to deflector 11 is considered vertical or perpendicular to deflector 11, whereas, distal portion 16 is non-perpendicular because it extends rearwardly at an angle which is not a right angle to the plane of deflector 11. Loop 23 is positioned around hook 12, is contiguous thereto, and extends upwardly therefrom in FIG. 1. Loop 23 is well suited for attachment to a conventional fishing line (not shown in FIGS. 1 and 2). As further seen in FIGS. 1 and 2, deflector 11 defines lip 24 providing it a general spoon like shape effecting a raised portion and a somewhat arcuate cross section. While part of deflector 11, lip 24 forms outer perimeter 25.

Turning now to FIGS. 3 and 4, the preferred embodiment is seen as hook assembly 30 includes generally flat, spoon like deflector 31 having lip 32. Hook assembly 30 is attached to hook 33 by bolt 34 and nut 39. Bolt 34 depends downwardly, vertically from deflector 31 and is attached to weight 35, which is generally conically shaped. Hook 33, like hook 12 (FIG. 1) extends along deflector 31 and passes through hole 36 defined by deflector 31. As opposed to hook 12 which is aligned with the longitudinal axis of deflector 11, hook 33 is perpendicular to longitudinal axis 37 (FIG. 4) of deflector 31, as hook 33 generally extends downwardly and away from weight 35 and in a nonperpendicular manner. Hook 33 may extend laterally or upwardly therefrom as well in other embodiments (not shown). Loop 38 is contiguous to hook 33 and extends upwardly therefrom as shown in FIG. 3 for attachment to a conventional fishing line.

It should be noted that weights other than those seen embodied in weights 20 and 35 are possible, such as square, rectangular, spherical or the like, as are differently aligned and sized hooks. While hook 33 bends laterally to the left side of hook assembly 30 in FIG. 4, it is equally within the scope of the present invention for hook 33 to bend laterally to the right side of hook assembly 30. In either position, hook 33 is well suited for use with a live lure. Likewise, while hook 12 in FIG. 1, is pointed towards weight 20, it is equally within the scope of the present invention to reverse hook 12 so that it points from weight 20. Additionally alternate loops such as loop 100 seen in FIG. 6 may also be used in place of loop 23. Note that loop 100 includes swivel 101 which allows upper loop 102 to pivot relative to lower loop 103. Additionally other conventional snap swivels such as available from the JANN'S NETCRAFT catalog, P.O. Box 89, Maumee, Ohio 43537 are also acceptable.

Hook assembly 10 is depicted in use in FIG. 5. Hook assembly 10 is attached to conventional fishing line 40 through loop 23 by a conventional knot. Lure 41 is positioned on hook 12 as is conventional. Lure 41 may be any number of synthetic or natural lures. Synthetic lures resembling eels, worms, crawdads, fish or the like are preferred, but natural worms or minnows are acceptable.

The preferred method of using the hook assemblies of the present invention includes baiting the hook assembly, such as hook assembly 10, with a lure, such as lure 41, by impaling lure 41 thereon. Hook assembly 10 is then tied to fishing line 40 and cast as is conventional into a body of water with a rod and reel (not shown). The user then trolls hook assembly 10 behind a boat (not shown) as is well understood and in the process, draws hook assembly 10 through the water (not shown) with lure 41 therebehind. Hook assembly 10 with deflector 11 and the placement of loop 23 with weight 20 causes water to flow around hook assembly 10 in such as manner as to agitate lure 41, thereby causing lure 41 to appear as if alive and moving. This agitation is much greater than prior hook assemblies in part because of deflector 11 and the counter balancing force of the weight as it passes through the water. It should be noted that the larger the weight, the deeper the hook assembly will run in the water. Likewise, larger weights are needed to counterbalance more buoyant lures. This simulated movement increases the likelihood that a fish will strike hook assembly 10 and become caught on hook 12 as is well understood. In the event of an unsuccessful cast, lure 41 may be replaced as desired and hook assembly 10 cast again. Such hook assemblies are well suited for use either from a pier, a beach, or as otherwise desired by the user, although such use may require reeling in hook assembly 10. It should be understood, that in the event of an unsuccessful cast or a change in the targeted fish, lure 41 can be changed to attract different types of fish depending on the locality and the type of fish desired.

The preceding recitation is provided as an example of the preferred embodiment and is not meant to limit the nature or scope of the present invention.

I claim:

1. A fishing hook assembly comprising:
   a) a deflector;
   b) a hook, said hook attached to said deflector, and depending outwardly therefrom, said hook comprising a barb;
   c) a threaded post, said threaded post depending from said deflector to form an angle with said hook;
   d) a weight, said weight releasably attached to said threaded post to stabilize said hook assembly during movement through water; and
   e) a loop said loop positioned intermediate said barb and said weight said loop attached to said deflector for attaching a fishing line thereto.

2. The fishing hook assembly of claim 1 wherein said hook extends parallel to said deflector.

3. The fishing hook assembly of claim 1 wherein said deflector is ovoid.

4. The fishing hook assembly of claim 1 wherein said deflector comprises an arcuate cross section.

5. The fishing hook assembly of claim 1 is formed from metal.

6. The fishing hook assembly of claim 1 further comprising a lure, said lure affixed to said hook.

7. The fishing hook assembly of claim 1 further comprising a second loop, said second loop coniguous to said hook.

8. A fishing hook assembly comprising:
   a) a generally flat ovoid deflector, said deflector comprising a rear section;
   b) a hook, said hook comprising a shank portion and an arcuate barb, said shank portion comprising a proximal portion and a distal portion, said proximal portion forming a crook and extending along said rear section, said distal portion extending downwardly from said deflector and at an angle thereto;
   c) a threaded bolt, said threaded bolt passing through said crook and said deflector;
   d) a nut, said nut attached to said bolt and contacting said deflector;
   e) a weight, said weight releasably attached to said threaded post; and
   f) a loop, said loop contiguous to said proximal portion of said shank portion for attachment to a fishing line.

9. The fishing hook assembly of claim 8 wherein said hook assembly is made from metal.

10. The fishing hook assembly of claim 8 further comprising a lure, said lure affixed to said hook.

11. The fishing hook assembly of claim 8 wherein said weight is conical.

12. The fishing hook assembly of claim 8 wherein said weight is generally egg-shaped.

13. The fishing hook assembly of claim 8 wherein said deflector comprises a lip, said lip forming an outer perimeter of said deflector.

14. The fishing hook assembly of claim 8 wherein said deflector defines a hole, said hook passing through said hole.

15. A method of fishing comprising the steps of:
   a) providing a fishing hook assembly which includes:
      i) a generally flat ovoid deflector having a rear section;
      ii) a hook, said hook comprising a shank portion and an arcuate barb, said shank portion having proximal and distal portions, said proximal portion extending along said rear section, said distal portion angled downwardly from said deflector;
      iii) a threaded post depending from said deflector; and
      iv) a loop;
   b) attaching the loop to a fishing line;
   c) attaching a lure to the hook;
   d) attaching a weight to the threaded post; and
   e) casting the lure into water.

16. The method of claim 15 and including the step of trolling the line behind a boat to attract fish thereto.

17. The method of claim 15 wherein attaching a lure to the hook comprises attaching a synthetic eel to the hook.

18. The method of claim 15 wherein attaching a lure to the hook comprises attaching a synthetic worm to the hook.

19. The method of claim 16 whereby trolling the lure comprises the step of deflecting the water with the hook assembly while maintaining the lure in a natural posture to simulate a life like fish movement through the water.

\* \* \* \* \*